United States Patent [19]
Sano et al.

[11] Patent Number: 4,997,256
[45] Date of Patent: Mar. 5, 1991

[54] OPTICAL FIBER ADAPTED FOR AIR BLOWN FIBER INSTALLATION

[75] Inventors: Hiroaki Sano; Yoshiaki Terasawa, both of Kanagawa; Kuni Hayashi, Tokyo, all of Japan

[73] Assignee: Sumitomo Electric Industries, Ltd., Osaka, Japan

[21] Appl. No.: 477,062

[22] Filed: Feb. 8, 1990

[30] Foreign Application Priority Data

Feb. 8, 1989 [JP] Japan .................................. 1-29265
Jan. 24, 1990 [JP] Japan .................................. 2-15625

[51] Int. Cl.$^5$ .............................................. G02B 6/44
[52] U.S. Cl. ................................................ 350/96.23
[58] Field of Search ........................... 350/96.10, 96.23

[56] References Cited

U.S. PATENT DOCUMENTS

| 4,038,489 | 7/1977 | Stenson et al. | 350/96.23 X |
| 4,093,342 | 6/1978 | Foord et al. | 350/96.23 |
| 4,166,670 | 9/1979 | Ramsay | 350/96.23 |
| 4,913,515 | 4/1990 | Braunmiller et al. | 350/96.23 |

FOREIGN PATENT DOCUMENTS

| 0157610 | 10/1985 | European Pat. Off. | 350/96.23 |
| 0198113 | 10/1986 | Japan | 350/96.23 |

Primary Examiner—Akm Ullah
Attorney, Agent, or Firm—Cushman, Darby & Cushman

[57] ABSTRACT

An optical fiber unit suitable for installation by the force of a fluid flowing through a passage. The unit includes at least one optical fiber and at least one interstitial cord. The fibers and cords are of the same diameter. They are bundled and surrounded by a first sheath that is formed of a material having a high Young's modulus. An outer sheath, of foamed polyethelene surrounds the first sheath.

5 Claims, 2 Drawing Sheets

OPTICAL FIBER ADAPTED FOR AIR BLOWN FIBER INSTALLATION

BACKGROUND OF THE INVENTION

1. Field of the Invention

The present invention relates to an optical fiber unit that is to be installed by the drag force of a pressure fluid flowing through a pipe. More particularly, the present invention relates to improvement in the blowing and transmission properties of such an optical fiber unit.

2. Description of the Related Art

European Patent Application 0 157 610 discloses an example of the conventional optical fiber units that are to be installed by the drag force of a pressure fluid flowing through a pipe, which is shown in FIG. 1. In this type of optical fiber unit, a plurality of optical fibers 31 are bundled together and surrounded by an outer sheath 33 made of polypropylene having high Young's modulus which in turn is surrounded by an outer sheath 34 formed of foamed polyethylene. The inner sheath 33 must have high Young's modulus in order to insure that the shrinkage stress developing in the outer sheath 34 made of foamed polyethylene at low temperatures will not affect the optical fibers 31. A Young's exceeding 1 kg/mm$^2$ is preferrable for the resin in the inner sheath 33 so as to prevent buckling or bending of the optical fibers. In order to satisfy such a structural requirement, it is desired that a plurality of optical fibers 31 are tightly fitted within the inner sheath 33. The outer sheath 34 is formed from foamed polyethylene since the optical fiber unit of a type that is to be installed by the drag force of a pressure fluid flowing through a pipe must be lightweight and have a constant surface area.

The conventional optical fiber unit shown in FIG. 1 has had the following structural problems. First, a plurality of optical fibers are arranged in such a way that the central fiber is surrounded by a layer of the other fibers and this limits the number of bundled optical fibers that can be accommodated. The conventional unit structure is unable to provide an optical fiber unit containing two or four optical fibers. Even if this is possible, a unit having a complete circular cross section is difficult to obtain. Next, a significant increase in transmission attenuation was observed in the optical fibers at low temperature. This would be explained as follows: the polypropylene in the inner sheath had high density and Young's modulus, however, because of the high viscosity of the resin, great strain remained in the extruded sheath and when the residual strain was released from the resin of the sheath, stress developed causing the contained optical fibers to follow a serpentine path; this phenomenon would become more pronounced at low temperatures since linear thermal expansion would come into play. Further, the inner sheath in the conventional structure is usually formed as a very thin layer, so it is extremely difficult to remove when performing end preparations for the purpose of branching and connecting optical fibers.

SUMMARY OF THE INVENTION

An object, therefore, of the present invention is to provide an optical fiber unit that is remarkably improved in low temperature characteristics, has the capability of accommodating an increased number of bundled fibers and in the performance of end preparations.

The above and other objects of the present invention can be achieved by an optical fiber unit of a type that is to be installed by the drag force of a pressure fluid flowing through a pipe, containing at least one optical fiber and more than one interstitial cord which are bundled and surrounded by an inner and outer sheathing to provide a unitary assembly, which inner sheath is made of a resin that has a high Young's modulus and that exhibits small residual strain during the application of sheathing. The outer sheath is made of a foamed polyethylene.

The object of the present invention can be attained in an effective way if the interstitial cord used in the optical fiber unit has substantially the same outside diameter as the optical fiber. Further, the object of the present invention can be attained in a more effective way if at least one of the interstitial cords has a sufficient strength to work as a rip cord that assists in ripping away the inner and outer sheaths when the optical fiber is withdrawn from the optical fiber unit during end preparations.

The optical fiber unit of the present invention comprises at least one optical fiber and more than one interstitial cord which are bundled and surrounded by an inner sheath (layer) and an outer sheathing of foamed polyethylene to provide a unitary assembly. The inner resin sheath is made of a resin that has high Young's modulus and that will exhibit small residual stress during the application of sheathing. A suitable example of the resin is a thermoplastic resin that has a melt index of at least 4 dg/min at 230° C. Melt index is a parameter that represents the fluidity of resin in an extruding machine, or a heat or radiation curable resin in which thermal shrinkage upon heating at 80° C. for 1 hour multiplied by Young's modulus at room temperature is not more than 4 kg/mm$^2$. The first type of resin may be exemplified by nylon and the second type by an ultraviolet curable resin available from DeSoto, Inc., U.S.A. under the trade name 950×042.

If the interstitial cords have the same outside diameter as the optical fiber and if at least one of them has the capability of working as a rip cord which assists in ripping away the inner and outer sheaths, a unit structure can easily be realized in which the interstitial cords are in intimate contact with the optical fiber and the inner sheathed optical fiber unit maintains a high degree of roundness, which contributes to a greater degree of freedom in increasing the number of bundled fibers to be incorporated in the unit. If a unit bundling two optical fibers is necessary, a structure that maintains a high degree of roundness can be formed by placing in the center an interstitial cord having the same outside diameter as the optical fibers and surrounding it with four interstitial cords of the same diameter as the optical fibers and two optical fibers. An optical fiber unit containing four optical fibers can be formed by surrounding the central interstitial cord with two interstitial cords and four optical fibers.

A high degree of roundness is required for the inner sheath in order to insure that an outer sheath can be applied in such a way as to provide the optical fiber unit with desired transmission and blowing properties as well as good product appearance. If the inner sheath does not have a high degree of roundness, it is inevitably difficult to obtain a satisfactorily round cross section after the applications of an outer sheath. Even if a round cross section is obtained by application of an outer sheath, the sheath applied is obviously non-uniform. If such an optical fiber unit is to be used in the application contemplated by European Patent Application 0 157 610, problems associated with the mechanism of blowing a pressure fluid or of sealing the pressure of a propellant fluid will take place when the optical fiber unit is propelled through a pipe. Further, asymmetricity in shape will often cause local bends in the optical fibers, which is not desirable from the viewpoint of transmission properties. Thus, the construction of the present invention described above is effective in avoiding these problems.

The use of the specified resin as the material for the inner sheathing of optical fibers is effective in reducing the residual strain that will occur in the extruded sheath. It was observed by the present inventors that the transmission properties, in particular, the low-temperature properties, of the optical fibers were by far improved over the optical fiber units found in the prior art that are intended to be installed by the drag force of a pressure fluid flowing through a pipe and that have the conventional construction. A plausible reason for this phenomenon is that compared to polypropylene that has been conventionally used as the material for the inner sheath and that has a melt index of about 2.0 dg/min at 230° C., nylon which is an example of the thermoplastic resin that can be used as the material for the inner sheath in the present invention has a higher melt index (ca. 5–10 dg/min) at 230° C. and hence experiences a smaller amount of residual strain, which will eventually reduce the residual stress that is exerted upon the optical fibers immediately after the application of sheathing. Further, the heat or radiation curable resin specified herein develops such a small amount of residual stress after the application of sheathing that no substantial strain would be exerted upon the optical fibers. This buffering action of the resin will be readily understood from the estimated residual stress of 4 kg/mm$^2$ which is the product of the Young's modulus of nylon at room temperature (ca. 200 kg/mm$^2$) and its thermal shrinkage upon heating at 80° C. for 1 hour (ca. 2%).

The number of interstitial cords to be inserted varies with the number of bundled optical fibers to be confined in the optical fiber unit. If at least one of the interstitial cords also serves as a rip cord that assists in ripping away the sheaths in according with one embodiment of the present invention, the sheaths can easily be removed when the optical fibers are withdrawn from the optical fiber unit in such cases as end preparations thereof.

The interstitial cords used in the optical fiber unit of the present invention do not necessarily have the same outside diameter as the optical fibers. If more than seven bundled fibers are to be incorporated, a larger-diameter interstitial cord may be positioned in the center of the optical fiber unit, with a plurality of bundled optical fibers being placed around said interstitial cord. This embodiment is also included within the scope of the present invention.

A colored interstitial cord may also be used and optical fibers can be readily distinguished from the interstitial cord if it is provided with a color different from the former.

Several examples of the present invention are described below with reference to the accompanying drawings.

DESCRIPTION OF THE PREFERRED EMBODIMENTS

Figure 2:
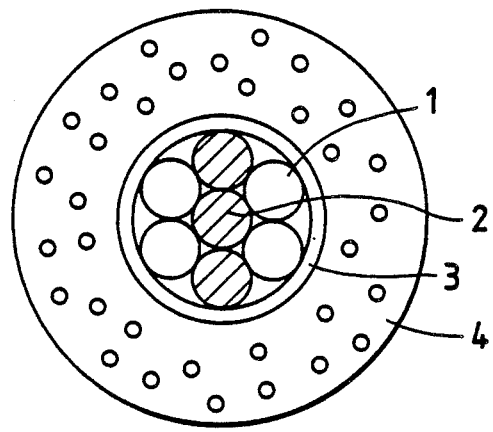
FIGS. 2 and 3 are cross sectional views showing the first and second embodiments, respectively, of the optical fiber unit according to the present invention.

FIG. 2 is a cross section of a first embodiment of the optical fiber unit according to the present invention. As shown, four optical fibers 1 and three interstitial cords 2 are bundled and surrounded by an inner sheath 3 formed from nylon, which in turn is surrounded by an outer sheath 4 made of foamed polyethylene to make an optical fiber unit containing four optical fibers. Each of the optical fibers 1 was a multimode glass fiber having an outside diameter of 0.125 mm that is sheathed with an ultraviolet curable resin to an outside diameter of 0.25 mm. The optical fiber unit fabricated in accordance with the first embodiment of the present invention has an outside diameter of 2.0 mm.

Figure 3:
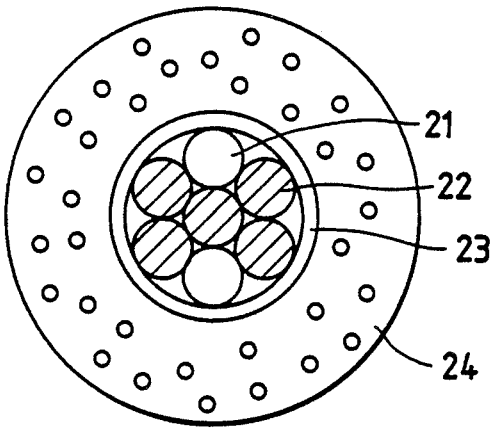

FIG. 3 is a cross section of a second embodiment of the optical fiber unit according to the present invention. As shown, two optical fibers 21 and five interstitial cords 22 are bundled and surrounded by an inner sheath 23 formed of nylon, which in turn is surrounded by an outer sheath 24 made of foamed polyethylene to make an optical fiber unit containing two optical fibers. The optical fibers 21 are the same as those employed in the first embodiment shown in FIG. 2. The optical fiber unit fabricated in accordance with the second embodiment of the present invention also has an outside diameter of 2.0 mm.

The interstitial cords used in the first and second embodiments are so selected that they would have certain levels of strength and flexibility. Polyester cords having an outside diameter of 0.25 mm are used in these embodiments and the present inventors confirmed that they were satisfactorily useful as rip cords.

Figure 1:
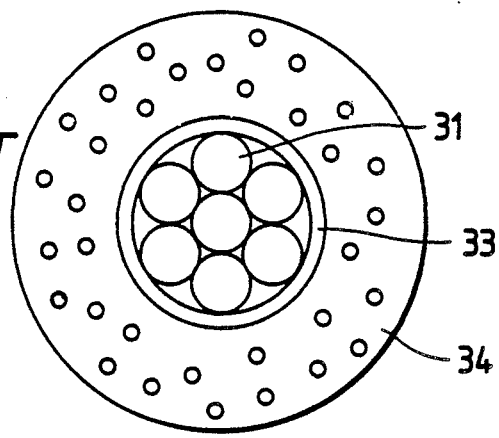
FIG. 1 is a cross section of a conventional optical fiber unit.

As a comparative example, an optical fiber unit having the conventional construction shown in FIG. 1 is fabricated. Seven multi-mode optical fibers sheathed with an ultraviolet curable resin to an outside diameter of 0.25 mm are bundled and provided with an inner sheath of polypropylene to an outside diameter of 1.0 mm. Foamed polyethylene is then extrusion sheathed onto the inner sheath to an outside diameter of 2.0 mm.

The first and second embodiments of the present invention and the conventional sample having the constructions shown in FIGS. 2, 3 and FIG. 1, respectively, were evaluated for their transmission properties at low temperatures and the ease with which the inner and outer sheaths could be removed. For this purpose, the increase in transmission attenuation that occurred in the three optical fiber units when the temperature was lowered from room temperature (20° C.) to −20° C. was measured, and in addition, the time required for removing the sheaths by a length 1 m from an end of each unit was also measured. The results are shown in Table 1. The light used in the measurements had a wavelength (λ) of 1.3 μm.

TABLE 1

| Fiber unit | Increase in transmission attenuation at low temperatures (dB/km) | Time required to remove the sheaths (sec/min) |
|---|---|---|
| Example | | |

TABLE 1-continued

| Fiber unit | Increase in transmission attenuation at low temperatures (dB/km) | Time required to remove the sheaths (sec/min) |
|---|---|---|
| 1 | 0.08 | 20 |
| 2 | 0.09 | 20 |
| Comparative Example | 0.30 | 180 |

The data in Table 1 shows that the optical fiber units of the present invention were significantly improved over the conventional version in terms of low-temperature properties and ease of end preparations. A knife cutter was used to remove the sheaths from the conventional optical fiber unit but this method was not only time-consuming but also caused frequent damage to the sheaths. The time required to remove the sheaths from the optical fiber units of the present invention was much shorter owing to the use of the rip cords.

In the optical fiber units of the first and second embodiments, the interstitial cords have the same outside diameter as the optical fibers and this is effective in providing the inner sheath with a full-layer structure consisting of a single central interstitial cord surrounded by six fibers or interstitial cords. The optical fibers were uniformly bundled to provide a round cross section compared to the conventional version shown in FIG. 1. It is therefore established that the optical fiber units of the present invention have satisfactory transmission and blowing properties.

A third embodiment of the present invention is fabricated by arranging optical fibers and interstitial cords as in the first embodiment except that the resulting bundle was sheathed with the ultraviolet curable resin (950×042 of DeSoto, Inc., U.S.A.; Young's modulus at R.T., 35 kg/mm$^2$), which is one of radiation curable resins, to an outside diameter of 1 mm. The inner sheath formed as such is surrounded by foamed polyethylene to an outside diameter of 2 mm. The resulting optical fiber unit was evaluated for the increase in transmission attenuation at low temperatures and the time required to remove the sheaths under the same conditions as those employed in the previous measurement. The results are shown in Table 2. The fiber unit performed better than the comparative example (see Table 1) in both evaluations. The inner sheath resin used in Example 3 had tensile elongation of about 25% which was much smaller than the value for nylon ($\geqq 100\%$). Because of this low tensile elongation, said inner sheath was much easier to break and the time required to remove the sheaths was shorter than in the examples 1 and 2.

TABLE 2

| Optical fiber unit | Increase in transmission attenuation at low temperatures (dB/km) | Time to remove the sheaths (sec/min) |
|---|---|---|
| Example 3 | 0.09 | 16 |

As described on the foregoing pages, the optical fiber unit of the present invention comprises a bundle of optical fibers and interstitial cords which is surrounded by an inner sheath that has high Young's modulus and that exhibits small strain during the application of sheathing, which inner sheath in turn is surrounded by an outer sheath made of a foamed resin to provide a unitary assembly. Owing to such a structure design, the optical fiber unit has a higher degree of freedom in increasing the number of bundled optical fibers to be confined and is capable of retaining the high degree of roundness of primarily bundled optical fiber unit. As a consequence, the problems that were previously encountered in blowing and transmission properties are solved by the present invention. If a rip cord that has sufficient strength to withstand the ripping away of the sheaths when the fibers are to be withdrawn from the optical fiber unit is used as an interstitial cord, end preparations of the fiber unit can be easily performed. Further, the optical fiber unit of the present invention has remarkably improved transmission properties at low temperatures.

An interstitial cord serving as a rip cord is preferably positioned on the periphery, rather than in the center, of the circular cross section formed by optical fibers and/or interstitial cords. In order to provide high tear strength, this interstitial cord is preferably made of a high Young's modulus material such as nylon, polyethylene terephthalate or Kevlar.

Figure 4:
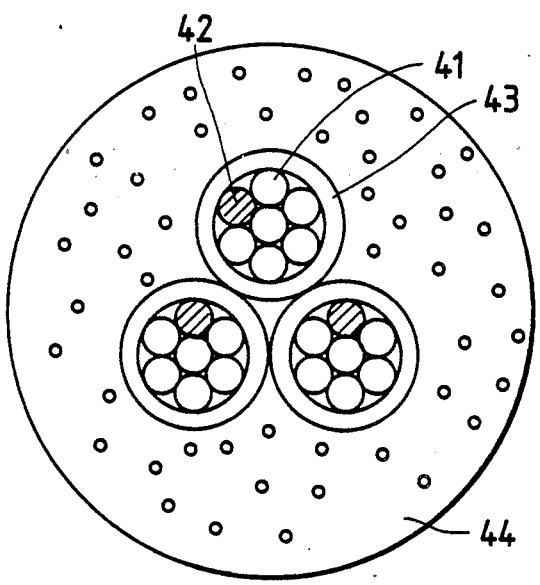
FIGS. 4 to 6 are cross sectional views of the fourth, fifth and sixth embodiments, respectively, of the optical fiber unit according to the present invention.
Figure 5:
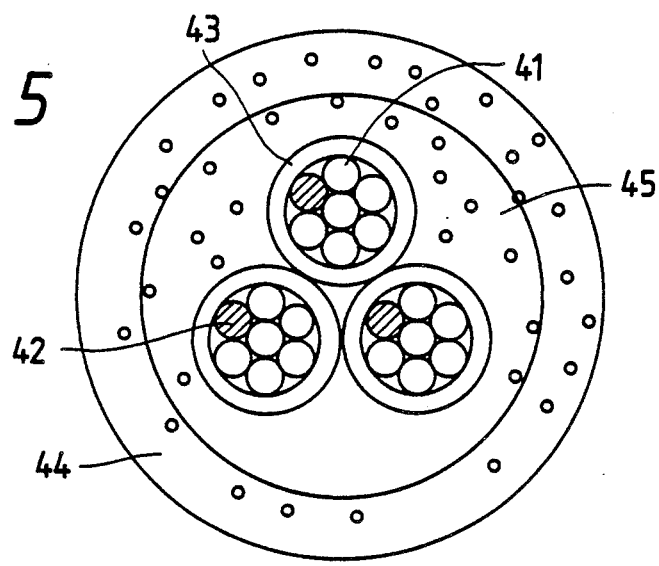
Figure 6:
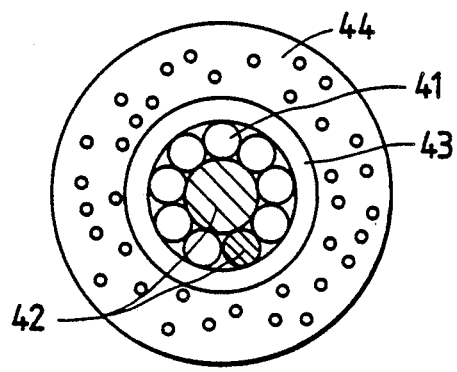

The advantages of the present invention are also attained even in the case where the inner sheath surrounds more than four optical fibers, as shown in FIG. 6 (sixth embodiment). The present invention is also applicable to the case where a plurality of fiber units with the inner sheath are assembled as shown in FIGS. 4 and 5 (fourth and fifth embodiments). This is because the interstitial cord makes the same degree of contribution to ripping property whereas the increase in the number of optical fibers encased in the same inner sheath results in a smaller burden per fiber for receiving the residual stress in the sheath, thereby providing improved rather than deteriorated transmission properties.

In FIGS. 4–6, reference numerals 41 and 42 represent an optical fiber and a interstitial cord, respectively, and reference numerals 43 and 44 represent an inner and outer sheaths, respectively. Further, reference numeral 45 represents a filling material.

What is claimed is:

1. An optical fiber unit suitable for installation by the drag force of a pressure fluid flowing through a pipe, said optical fiber unit comprising:
   at least one optical fiber;
   at least one interstitial cord;
   first sheathing means for sheathing and bundling said optical fiber and said interstitial cord, said first sheathing means being substantially round in cross section, said first sheathing means being formed of a resin having a high Young's modulus and characterized in that the product of thermal shrinkage upon heating at 80° C. for 1 hour and Young's modulus at room temperature is not more than 4 kg/mm$^2$; and
   second sheathing means for sheathing said first sheathing means, said second sheathing means being integrally assembled with said first sheathing means, said second sheathing means being made of a foamed resin.

2. The optical fiber unit according to claim 1, wherein said resin comprises a heat curable resin.

3. The optical fiber unit according to claim 1, wherein said resin comprises a radiation curable resin.

4. An optical fiber unit suitable for being installed by the drag force of a pressure fluid flowing through a pipe, said optical fiber unit comprising:
   at least one optical fiber;
   at least one interstitial cord having the same diameter as said optical fiber;

first sheathing means for sheathing and bundling said optical fiber and said interstitial cord, said first sheathing means being substantially round in cross section, said first sheathing means being formed of a resin having a high Young's modulus and characterized in that the product of thermal shrinkage upon heating at 80° C. for 1 hour and Young's modulus at room temperature is not more than 4 kg/mm$_2$; and second sheathing means for sheathing said first sheathing means, said second sheathing means being integrally assembled with said first sheathing means, said second sheathing means being made of a foamed resin.

5. The optical fiber unit according to claim 4 wherein at least one of said interstitial cords is a rip cord for assisting in ripping away said first and second sheathing when said optical fiber is withdrawn from said optical fiber unit.

* * * * *